United States Patent
Clerici et al.

(10) Patent No.: US 7,138,184 B2
(45) Date of Patent: Nov. 21, 2006

(54) COATING COMPOSITION

(75) Inventors: Vittorio Clerici, Oestrich-Winkel (DE);
Alexandra Wilhelmi, Ingleheim (DE);
Jiro Yamashita, Kaisei (JP)

(73) Assignee: Dow Corning Corporation, Midland, MI (US)

( * ) Notice: Subject to any disclaimer, the term of this patent is extended or adjusted under 35 U.S.C. 154(b) by 261 days.

(21) Appl. No.: 10/275,721

(22) PCT Filed: May 11, 2001

(86) PCT No.: PCT/EP01/05512

§ 371 (c)(1),
(2), (4) Date: Dec. 1, 2003

(87) PCT Pub. No.: WO01/85854

PCT Pub. Date: Nov. 15, 2001

(65) Prior Publication Data

US 2004/0127625 A1    Jul. 1, 2004

(30) Foreign Application Priority Data

May 11, 2000  (GB) ................................. 0011255.7
May 1, 2001   (GB) ................................. 0110627.7

(51) Int. Cl.
*B32B 27/20*   (2006.01)
*B32B 27/06*   (2006.01)
*B32B 27/08*   (2006.01)
*C08L 83/02*   (2006.01)

(52) U.S. Cl. ..................... 428/447; 428/448; 428/450; 524/859

(58) Field of Classification Search ............... None
See application file for complete search history.

(56) References Cited

U.S. PATENT DOCUMENTS

| 3,832,204 | A | * | 8/1974 | Boaz ..................... 106/287.11 |
| 4,098,749 | A |   | 7/1978 | Hoshino et al. ........... 260/30.6 |
| 4,209,555 | A |   | 6/1980 | Stewart ...................... 427/292 |
| 4,290,811 | A | * | 9/1981 | Brown et al. ............... 106/1.17 |
| 4,645,790 | A | * | 2/1987 | Frey et al. ................... 524/442 |
| 5,324,545 | A |   | 6/1994 | Flamme ..................... 427/406 |
| 5,393,611 | A |   | 2/1995 | Flamme ..................... 428/450 |
| 5,593,492 | A | * | 1/1997 | Schaffer et al. ............. 106/623 |
| 5,720,902 | A |   | 2/1998 | Zefferi et al. .......... 252/389.31 |

FOREIGN PATENT DOCUMENTS

| DE | 39 20 297 A1   | 6/1989  |
| EP | 0 808 883 B1   | 9/2001  |
| GB | 1 212 424      | 5/1968  |
| GB | 1 360 452      | 9/1971  |
| GB | 1380748        | 12/1972 |
| GB | 1499556        | 11/1975 |
| WO | WO 90/15852    | 12/1990 |
| WO | WO 97/13888 A1 | 4/1997  |
| WO | WO 02/088262 A1| 11/2002 |

* cited by examiner

Primary Examiner—Michael J. Feely
(74) Attorney, Agent, or Firm—Patricia M. Scaduto

(57) ABSTRACT

A Chromium VI-free coating composition comprises a binder and a corrosion inhibitor in a solvent, wherein the binder comprises a silicate and an organic titanate, and the corrosion inhibitor comprises aluminium particles and zinc particles preferably flakes. The composition may also comprise an anti-corrosion additive which comprises a metal phosphate, a lubricant which comprises a polyolefin wax, and/or a thickener. The coating composition is useful for coating substrates such as nuts, bolts and other fasteners, door, bonnet and boot lock parts, hinges, door stoppers, window guides, seat belt components, brake rotors and drums, and other transportation industry related parts.

13 Claims, No Drawings

COATING COMPOSITION

CROSS REFERENCES TO RELATED APPLICATIONS

The present application is a US national stage filing under 35 USC 371 and claims priority from PCT Application No. PCT/EP01/05512 filed on May 11, 2001, currently pending, which claims priority from GB 001255.7 filed May 11, 2000 and GB 0110627.7 filed on May 1, 2001. The above identified applications are incorporated by reference in their entirety.

FIELD OF THE INVENTION

The present invention relates to a coating composition, for use in the protection of metal surfaces, which comprises a binder, a corrosion inhibitor, and a solvent.

BACKGROUND OF THE INVENTION

It is well known to treat metal surfaces such as iron and steel with some form of corrosion inhibiting treatment or coating. Corrosion inhibiting coatings are well known in the art and generally contain metal particles in particular zinc and/or aluminium particles as active ingredients together with some form of binder.

GB 1380748 describes a coating composition particularly, but not exclusively, for a zinc filled coating composition which when applied to a metal surface will provide galvanic protection to the metal. The composition comprises trialkoxysilanes which have been cohydrolysed and cocondensed with a hydrolysable titanium ester. The Silane is selected from $RSi(OR')_3$ and $RSi(OR''OR''')_3$ where R and R' are monovalent aliphatic or aromatic hydrocarbon radicals having up to 10 carbon atoms, R'' is a divalent hydrocarbon radical having from 2 to 6 carbon atoms and R''' are monovalent aliphatic or aromatic hydrocarbon radicals having up to 10 carbon atoms or hydrogen.

GB 1499556 relates to a process for hydrolyzing ethyl silicate to form a gellable liquid hydrolysate which is used for mixing with powders such as powdered zinc for use in an anti-corrosion paint. The ethyl silicate is acid hydrolysed and the solvent for the hydrolysis is acetone or an alcohol EP0808883 discloses a water-reducible coating composition for corrosion protection comprising particulate metal such as aluminium or zinc and a water reducible organofunctional silane. Epoxy silanes, particularly beta-(3,4-epoxycyclohexyl)ethyltrimethoxysilane and/or gamma glycidoxypropyltrimethoxysilane were preferred. Other constituents included a high boiling point organic liquid, a water soluble cellulose based thickener and a wetting agent.

U.S. Pat. Nos. 5,393,611 and 5,324,545 both relate to a dip-coating method for protecting chromatised or passivated zinc coatings on steel or the like using a composition of a titanic acid ester and a "so-called" organofunctional polysiloxane, preferably having between 2 and 10 siloxane repeating units and epoxy end groups. There is no clear definition of the meaning of the term organofunctional polysiloxane in either of these documents but it would seem to mean a polymer with a siloxane backbone having at least one Si—R bond where R is an unsaturated or functionally substituted hydrocarbon radical. Confusingly however the examples in U.S. Pat. Nos. 5,393,611 and 5,324,545 both teach that rather than an organofunctional polysiloxane being used the preferred silicon containing compound is an epoxy silane, namely gamma glycidoxypropyltrimethoxysilane.

The present inventors have found an increasing demand from industry for coatings for metal surfaces which can provide a high level of corrosion protection, cathodic protection, and "for-life" dry lubrication (i.e. the metal surface needs coating only once during its working life) with defined and constant coefficient of friction, whilst being Chromium VI-free and providing an attractive appearance to articles coated with the coating. Commercially available coatings are unable to satisfy all of these demands.

BRIEF SUMMARY OF THE INVENTION

According to the present invention there is provided a coating composition which comprises a binder and a corrosion inhibitor in a solvent, wherein the binder comprises a silicate and an organic titanate, and the corrosion inhibitor comprises aluminium particles and zinc particles.

DETAILED DESCRIPTION OF THE INVENTION

The binder used in the composition of the present invention comprises a silicate and an organic titanate. For the avoidance of doubt, it is to be understood that the term silicate is used to mean a compound which contains substantially no Si—C bonds, i.e. that carbon linkages to silicon in silicates as described in this invention are substantially always via an oxygen atom (i.e. an Si—O—C bond). Most preferably a silicate in accordance with this invention contains no Si—C bonds. Preferably, the binder comprises 20 to 60% by weight (e.g. 30 to 45%) silicate, and 40 to 80% by weight (e.g. 55 to 70%) organic titanate to a total of 100% by weight.

Suitable silicates include colloidal silica and organic silicates, with the latter being preferred. Suitable organic silicates include silicate esters, for example silicate ester monomers (e.g. ethyl silicate), hydrolysate (e.g. silicic ester hydrolysate) and alkoxysilanes, preferably tetraalkoxysilanes, although silicate ester polymers are most preferred, (e.g. alkyl polysilicates where the alkyl group has 1 to 6 carbon atoms and is most preferably methyl or ethyl).

Suitable organic titanates include titanate chelates (e.g. titanium acetylacetonate and triethanolamine titanate) and titanate esters, with the latter being preferred. Suitable titanate esters include titanate ester monomers (e.g. tetraalkyltitanates wherein each alkyl group is the same or different and contains between 1 and 12 carbon atoms, examples include tetrabutyltitanate, tetraisooctyltitanate, and tetraisopropyltitanate), although titanate ester polymers are preferred (e.g. alkylpolytitanates such as butylpolytitanate).

The corrosion inhibitor used in the composition of the present invention comprises aluminium particles and zinc particles. The aluminium particles may be in the form of powder, paste or flake, with aluminium flake (leafing or non-leafing) being preferred. The aluminium particles preferably have an average particle size of 4 to 20 µm, more preferably 6–15 µm. The zinc particles may be in the form of zinc powder, for example zinc spheres or zinc flake, preferably zinc flake. The zinc particles preferably have an average particle size of 6 to 26 µm, more preferably 8–15 µm. The corrosion inhibitor preferably comprises 80 to 97% by weight (e.g. 87 to 95%) of zinc particles, and 3 to 20% by weight (e.g. 5 to 13%) of aluminium particles to a total of 100% by weight.

The composition of the present invention may also comprise a metal phosphate as an anti-corrosion additive. Preferred metal phosphates are zinc phosphates, including modified zinc orthophosphates (e.g. modified zinc aluminium-orthophosphatehydrate) and modified zinc polyphosphates (e.g. modified zinc aluminium-polyphosphate hydrate), with the latter being most preferred. The metal phosphate may be present in an amount of up to 33% by weight of the solid content of the composition of the present invention (i.e. without the solvent), preferably 5 to 20% by weight:

The composition of the present invention may further comprise a thickener, e.g. silica and/or organic modified clay, in an amount of up to 4% by weight of the solid content of the composition, preferably from 1 to 3% by weight.

The composition of the present invention may still further comprise a lubricant, for example a wax, including hydrocarbon waxes and polytetrafluoroethylene (PTFE) wax, preferably a polyolefin-containing wax (e.g. micronised polypropylene hydrocarbon wax), in an amount of up to 8% by weight of the solid content of the composition, preferably from 1.5 to 4.5% by weight.

Suitable solvents for use in the composition of the present invention are well known in the art. Organic solvents are suitable, including alcohols (e.g. methanol, ethanol, propanol, butanol), ketones (e.g. acetone, methyl ethyl ketone, methyl butyl ketone, cyclohexanone), esters (e.g. butyl acetate), and mixtures thereof. However, preferred solvents for the coating composition are hydrocarbon solvents, in particular white spirits, due to their high evaporation rates and low levels of aromatic compounds. Particularly preferred white spirits are those containing $C_{11}$–$C_{16}$ normal, iso- and cycloalkanes.

The coating composition of the present invention thus comprises a binder and corrosion inhibitor in a solvent, and preferably a metal phosphate anti-corrosion additive, a lubricant, and a thickener. Preferably, the solid content of the composition comprises 50 to 80%, more preferably 65 to 80%, by weight corrosion inhibitor, 9 to 18%, more preferably 11 to 16%, by weight of binder, up to 33%, more preferably 5 to 20% by weight of metal phosphate, up to 8%, more preferably 1.5 to 4.5% by weight of lubricant, and up to 4%, more preferably 1 to 3% by weight thickener.

The coating composition of the present invention can be prepared by mixing its components together using conventional apparatus, preferably by first blending some of the solvent and binder, then adding the corrosion inhibitor, and then finally adding the remaining solvent.

The coating composition of the present invention may be applied to a surface by any conventional application technique, for example brushing, dip-spinning dipping, and spraying (e.g. by aerosol can). Other common application methods include spraying drums, centrifuges, electrostatic or automatic spraying, printing and roller coating. The chosen method of application will depend upon the shape, size, weight and quantity of items to be coated. Preferably, 2, 3 or more coating layers are applied. The coating thickness has an influence on the life and properties of the resulting coating, and should be greater than the roughness of the surface, typically from 5 to 25 μm. Once the surface has been coated with the composition, it is dried to evaporate the solvent and cure the coating. The coating composition can be cured by, for example, heating at 200° C. for 10 minutes.

The coating composition of the present invention may be used alone or in combination with other commercially available anti-friction or anti-corrosive coatings. A preferred commercially available anti-friction coating which may be utilised in combination with the composition of the present invention has the following composition (percentages by weight), and is referred to hereinafter as "top-coat A":

20–25% lubricant—mixture of phenolic, epoxy and vinyl butyral resins, and PTFE.
70–75% solvent—mixture of methyl ethyl ketone, methyl isobutyl ketone, and cyclohexanone.

The coating composition of the present invention may be used in combination with a metal particle free top-coat hereafter referred to as "top-coat B" comprising a silicate as herein before described and an organic titanate as herein before described. The top-coat may optionally include any other components as herein before described for the coating composition of the present invention other than the metal (i.e. zinc and aluminium) particles. The top-coat is described in the applicants co-pending patent application GB 0110627.7.

Particularly preferred combinations of coating layers include:
1, 2 or 3 coating layers of the composition of the present invention.
1, 2 or 3 coating layers of the composition of the present invention followed by 1 to 3 coating layers of top-coat B
1 or 2 coating layers of the composition of the present invention followed by 1, 2 or 3 coating layers of top-coat A.

Another possibility is the combination of all three coatings, i.e. 1 or 2 coating layers of the composition of the present invention followed by 1, 2 or 3 coating layers of top-coat A and finally followed by 1 to 3 coating layers of top-coat B, although this combination is highly unlikely to be utilised for reasons of cost alone.

Substrates may be pretreated prior to coating with the coating composition of the present invention to improve adhesion and life of the resulting protective coating. Conventional methods of pretreatment include degreasing (for example, using solvents or steam), treatment of corroded surfaces by acid or alkali, phosphating, oxalic acid treatment of stainless steel, sandblasting and anodizing.

The coating composition according to the present invention can thus be used to provide a protective coating, for metals prone to corrosion, such as iron and steel. The provision of a protective coating on a substrate will result in high corrosion resistance, cathodic protection, and, when a lubricant is utilised, for life lubrication with a defined and constant coefficient of friction for articles such as automotive components is provided, for example nuts, bolts and other fasteners, door, bonnet and boot lock parts, hinges, door stoppers, window guides, seat belt components, brake rotors and drums, and other transportation industry related parts.

A further embodiment of the present invention relates to a substrate coated with the coating composition as hereinbefore described and to a method of coating such a substrate with a coating composition as hereinbefore described.

EXAMPLES

The present invention will now be illustrated by way of example. All percentages are by weight.

Example 1

A coating composition according to the present invention was prepared by mixing the following materials:
8% ethyl silicate polymer
13% polybutyl titanate
3% aluminium pigment
33% zinc pigment
5% zinc-aluminium phosphate 34% petroleum white spirit
2% polypropylene wax
0.6% silica
0.6% organic modified clay

Example 2

Substrate Pretreatment

Steel bolts, 10 mm diameter by 60 mm in length, were pretreated by sandblasting.

Example 3

Substrate Coating

The pretreated bolts of Example 2 above were coated with coating compositions AF1 to AF3 below. Each coating layer was applied by dip spinning in a centrifuge, partial curing for 10 minutes at 200° C., followed by further dip spinning and full cure at 200° C. for 10 minutes.

AF1—2 coating composition of Example 1 alone.
AF2—3 coating composition of Example 1 alone.
AF3—2 coating composition of Example 1 followed by 2 coating layers of Coating A described hereinabove.

A comparative anti-friction coating (CAFI) was also prepared which consists of 3 coating layers of Coating A described hereinabove.

Example 4

Corrosion Resistance

Salt spray test DIN 50021 was performed on the AF1 to AF3 bolts prepared according to Example 3 above. The results are shown in Tables 1 to 3 below (average results taken from test results for 10 bolts):

TABLE 1 coating AF1

| Test | Time (hours) | % red rust corrosion Thread | Head |
|---|---|---|---|
| 1 | 480 | 0.0 | 0.0 |
|  | 900 | 0.0 | 0.0 |
| 2 | 480 | 0.0 | 0.0 |
|  | 900 | 0.0 | 0.0 |
| 3 | 480 | 0.0 | 0.0 |
|  | 900 | 0.0 | 0.0 |
| 4 | 480 | 0.0 | 0.0 |
|  | 900 | 0.0 | 0.0 |

TABLE 2 coating AF2

| Test | Time (hours) | % red rust corrosion Thread | Head |
|---|---|---|---|
| 1 | 480 | 0.0 | 0.0 |
|  | 720 | 0.0 | 0.0 |
|  | >900 | 0.0 | 0.0 |
| 2 | 480 | 0.0 | 0.0 |
|  | 720 | 0.0 | 0.0 |
|  | >900 | 0.0 | 0.0 |
| 3 | 480 | 0.0 | 0.0 |
|  | 720 | 0.0 | 0.0 |
|  | >900 | 0.0 | 0.0 |
| 4 | 480 | 0.0 | 0.0 |
|  | 720 | 0.0 | 0.0 |
|  | >900 | 0.0 | 0.0 |

TABLE 3 coating AF3

| Test | Time (hours) | % red rust corrosion Thread | Head |
|---|---|---|---|
| 1 | 480 | 0.0 | 0.0 |
|  | 900 | 0.0 | 0.0 |
| 2 | 480 | 0.0 | 0.0 |
|  | 900 | 0.0 | 0.0 |
| 3 | 480 | 0.0 | 0.0 |
|  | 900 | 0.0 | 0.0 |
| 4 | 480 | 0.0 | 0.0 |
|  | 900 | 0.0 | 0.0 |

Example 5

Lubrication

The coefficient of friction of the AF 1 and AF3 coated bolts prepared according to Example 3 above was determined using an Erichsen AP 541 Bolt Testing Machine. Testing was performed on bolts having been tightened 1 and 3 times and against different surfaces. The results are shown in Table 4 below:

TABLE 4

| Coating | Surface | Tightenings | Total coeff. of friction | ±variation |
|---|---|---|---|---|
| None | Steel | 1 | 0.195 | 0.035 |
| AF1 | Steel | 1 | 0.112 | 0.003 |
| AF1 | Steel | 1 | 0.123 | 0.005 |
| AF1 | Painted steel | 1 | 0.129 | 0.008 |
| AF1 | Aluminium | 1 | 0.138 | 0.003 |
| AF1 | Steel | 3 | 0.114 | 0.003 |
| AF1 | Steel | 3 | 0.127 | 0.007 |
| AF1 | Painted steel | 3 | 0.131 | 0.009 |
| AF1 | Aluminium | 3 | 0.140 | 0.004 |
| AF3 | Steel | 1 | 0.114 | 0.006 |
| AF3 | Steel | 1 | 0.100 | 0.006 |
| AF3 | Painted steel | 1 | 0.109 | 0.008 |
| AF3 | Aluminium | 1 | 0.104 | 0.002 |
| AF3 | Steel | 3 | 0.114 | 0.009 |
| AF3 | Steel | 3 | 0.108 | 0.013 |
| AF3 | Painted steel | 3 | 0.114 | 0.012 |
| AF3 | Aluminium | 3 | 0.114 | 0.007 |

Example 6

Cathodic Protection

Unpretreated iron panels were degreased and coated on one side with the coating composition of Example 1 above and with the anti-friction coating CAF1 using an Erichsen spiral film applicator. The panels were then cured for 10 minutes at 200° C. After cooling, the dry thickness of the cured coatings was measured. Corrosion protection tape was then applied to the untreated surfaces of each panel and an X-cut made in the coated surface of each panel until the metal surface was reached. The panels were then placed into a salt spray tester (DIN 50021) until red rust formation was noticed, and the results are given in Table 5 below:

TABLE 5

| AF coating | Thickness (µm) | red rust formation after [hours] |
|---|---|---|
| Example 1 | 4 | 144 |
| Example 1 | 7.5 | 312 |
| CAF1 | 10 | 24 |

Example 7

Bolts of the type described in example 2 were coated with 2 layers of the coating composition of example 1 and cured as described in Example 3. After curing the coated bolts were provided with two alternate top-coats of the type referred to above as coating B. The top-coat compositions were prepared by mixing the materials identified in Table 6 as follows:—

The polybutyl titanate and ethyl polysilicate were added into a mixing kettle with a dissolver disk for a period of 10 minutes. Simultaneously a slurry of the silica, clay zinc-aluminium phosphate and, when present, polypropylene wax in a proportion of the Petroleum white spirit (about 9% by weight of solvent in sample 2 and about 20% by weight of solvent in example 1) was prepared in an Ultra turrax homogeniser. The slurry was then added into polybutyl titanate and ethyl polysilicate mixture and the resulting mixture was mixed with the dissolver disk for a period of 30 minutes at which time the residual amount of solvent was added and the final mixture was mixed in the presence of the dissolver disk for a further 10 minutes. It will be seen that sample TC1 omits the anti-corrosion additive zinc-aluminium phosphate.

TABLE 6

| Components | Sample TC1 Wt % | Sample TC2 Wt % |
|---|---|---|
| Petroleum white spirit | 47.45 | 43.61 |
| Polybutyl titanate | 24.34 | 22.38 |
| Ethyl polysilicate | 24.34 | 22.38 |
| Silica | 1.15 | 1.06 |
| Organic modified clay | 1.00 | 0.91 |
| zinc-aluminium phosphate | 0.00 | 8.08 |
| Polypropylene wax | 1.72 | 1.58 |
| complete: | 100.00 | 100.00 |

The top-coat compositions, samples TC1 and TC2 were applied in an identical fashion to the coating composition of the present invention and each layer applied was cured at 200° C. for 10 minutes.

Example 8

Corrosion Resistance

Salt spray test DIN 50021 was performed on the bolts prepared as discussed in Example 7. The results are shown in Table 7 below (average results taken from test results for 10 bolts). In each test two layers of the coating composition in accordance with the invention were coated on to each bolt but the number of layers of the alternative top-coats was varied as indicated in Table 7:

TABLE 7

Corrosion resistance (with top-coat)

| Coating | Time (hours) | % of red rust on head of bolt |
|---|---|---|
| Coating 8.1 (no top-coat) | 900 | 0.0 |
| Coating 8.2 (1 layer of TC1) | 2000 | 1.7 |
| Coating 8.3 (1 layer of TC2) | 2000 | 0.0 |
| Coating 8.4 (2 layers of TC1) | 2000 | 1.0 |
| Coating 8.5 (2 layers of TC2) | 2000 | 0.0 |

The above should be compared with the results provided in Table 7a in which the same test was carried out with a commercially available product which comprises zinc and aluminium particles and a binder comprising a mixture of tetrabutyltitanate and trimethoxyvinylsilane both with and without a top-coat. It is understood that the comparative top-coat is an organic resin comprising phenolic and epoxy components which may in addition comprise up to about 30% by weight of polytetrafluoroethylene (PTFE). It will be noted that the amount of red rust which appears on bolts coated with the comparative base-coat/comparative top-coat combination is significantly greater than for coatings comprising only the comparative base-coat. Furthermore, sets of comparative results shown in Table 7a are also significantly worse than the results in Tables 1, 2 and 3.

TABLE 7a

| Comparative Coatings | Time (hours) | % of red rust on head of bolt |
|---|---|---|
| Comparative base-coat (2 layers of base-coat only) | 240 | 3.0 |
|  | 480 | 6.0 |
| Comparative base-coat + top-coat (2 layers of comp. Base-coat + 1 layer of comp top-coat) | 240 | 16.0 |

Example 9

Lubrication (with Top-coat)

The coefficient of friction of the coated bolts prepared according to Example 8 was analysed as described in Example 5. Testing was performed on bolts having been tightened 1 and 3 times using a steel surface. Coatings 9.1, 9.2 and 9.3 are equivalent to coatings 8.1, 8.4 and 8.5 in example 8. The results are shown in Table 8 below:

TABLE 8

Lubrication (with top-coat B)

| Coating | Tightenings | Surface | Coeff. of friction | ±variation |
|---|---|---|---|---|
| 9.1 | 1 | Steel | 0.117 | 0.005 |
| 9.1 | 3 | Steel | 0.117 | 0.004 |
| 9.2 | 1 | Steel | 0.122 | 0.003 |
| 9.2 | 3 | Steel | 0.124 | 0.004 |
| 9.3 | 1 | Steel | 0.127 | 0.003 |
| 5.3 | 3 |  | 0.118 | 0.003 |

The invention claimed is:

1. A coating composition which comprises a binder and a corrosion inhibitor in a solvent, wherein the binder consists essentially of a silicate and an organic titanate, and the corrosion inhibitor comprises aluminium particles and zinc particles.

2. A composition according to claim 1 wherein the binder comprises 20 to 60% by weight silicate and 40 to 80% by weight organic titanate to a total of 100% by weight.

3. A composition according to claim 1 wherein the corrosion inhibitor comprises 80 to 97% by weight of zinc particles and 3 to 20% by weight of aluminium particles to a total of 100% by weight.

4. A composition according to claim 1 which further includes an anti-corrosion additive which comprises a metal phosphate.

5. A composition according to claim 1 which further includes a lubricant which is selected from the group of a hydrocarbon or polytetraethylene wax.

6. A composition according to claim 1 which further includes a thickener.

7. A composition according to claim 1 having a solid content which comprises 50 to 80% by weight of corrosion inhibitor, 9 to 18% by weight of binder, 0 to 33% by weight of a metal phosphate, 0 to 8% by weight of a lubricant, and 0 to 4% by weight of a thickener.

8. A substrate having a coating which is formed from 1,2 or 3 coating layer(s) of a composition according to claim 1.

9. A substrate having a coating in accordance with claim 8, wherein there is provided a further 1 to 3 layers of a metal particle free top-coat comprising a silicate and an organic titanate in a solvent.

10. A substrate in accordance with claim 8 wherein the substrate is selected from nuts, bolts and other fasteners, door, bonnet and boot lock parts, hinges, door stoppers, window guides, seat belt components, brake rotors and drums, and other transportation industry related parts.

11. A composition according to claim 1 which further includes a lubricant which is selected from the group of a hydrocarbon or polytetrafluoroethylene wax.

12. A substrate having a coating which is formed from 1, 2 or 3 layer(s) of a composition which comprises a binder and a corrosion inhibitor in a solvent, wherein the binder comprises a silicate and an organic titanate, and the corrosion inhibitor comprises aluminum particles and zinc particles, and a further 1, 2 or 3 coating layers of an additional coating composition which comprises 20–25% by weight of a lubricant mixture of phenolic resin, epoxy resin, vinyl butyral resin, and polytetrafluoroethylene, and 70–75% by weight of a solvent mixture of methyl ethyl ketone, methyl isobutyl ketone, and cyclohexanone.

13. A substrate in accordance with claim 12 wherein the substrate is selected from nuts, bolts and other fasteners, door, bonnet and boot lock parts, hinges, door stoppers, window guides, seat belt components, brake rotors and drums, and other transportation industry related parts.

* * * * *